(12) United States Patent
Tiemens et al.

(10) Patent No.: US 8,101,103 B2
(45) Date of Patent: Jan. 24, 2012

(54) EARBUD AND METHOD OF MANUFACTURE

(75) Inventors: Jim Tiemens, Laguna Nigel, CA (US); Stephen D. Gilder, Chula Vista, CA (US)

(73) Assignee: Honeywell International Inc., Morristown, NJ (US)

( * ) Notice: Subject to any disclaimer, the term of this patent is extended or adjusted under 35 U.S.C. 154(b) by 1069 days.

(21) Appl. No.: 12/002,906

(22) Filed: Dec. 19, 2007

(65) Prior Publication Data

US 2008/0187161 A1 Aug. 7, 2008

Related U.S. Application Data

(60) Provisional application No. 60/899,895, filed on Feb. 6, 2007.

(51) Int. Cl.
B29C 67/00 (2006.01)
B29C 33/40 (2006.01)

(52) U.S. Cl. ....... 264/46.9; 264/222; 264/250; 264/255; 264/259; 264/271.1; 264/275; 264/278; 29/896.2; 29/896.21

(58) Field of Classification Search ................. 264/46.9, 264/222, 250, 255, 259, 271.1, 275, 278; 29/896.2, 896.21
See application file for complete search history.

(56) References Cited

U.S. PATENT DOCUMENTS

| 5,455,994 | A | * | 10/1995 | Termeer et al. | ............ 29/896.21 |
| 5,920,636 | A | | 7/1999 | Oliveira et al. | |
| 7,236,605 | B2 | | 6/2007 | Oliveira et al. | |
| 7,489,794 | B2 | * | 2/2009 | Harvey | .......................... 381/380 |
| 2006/0213524 | A1 | | 9/2006 | Woo et al. | |
| 2008/0187159 | A1 | * | 8/2008 | Blanchard | ...................... 381/328 |
| 2010/0084217 | A1 | * | 4/2010 | Blanchard | ...................... 181/135 |

FOREIGN PATENT DOCUMENTS

EP 0 270 268 A2 12/1987

* cited by examiner

Primary Examiner — Ngan Ngo
(74) Attorney, Agent, or Firm — Conley Rose, P.C.; Kristin Jordan Harkins

(57) ABSTRACT

An earbud (10) for carrying sound from a source (16) to a person's ear canal, includes a soft foam body (20) and a sleeve (26) of stiffer material lying within the body. The body is molded around the sleeve and is chemically bonded to the sleeve without an adhesive between them. The earbud is molded around the sleeve by placing the sleeve on a mandrel pin (42) within a mold cavity (32), placing foamable material in the mold and closing the mold. The mold has shoulders with one mold shoulder (52) that abuts one end (46) of the sleeve and another mold shoulder (60) that lies within 0.1 millimeter of the other sleeve end (62), to prevent foaming material from leaking into the space (64) between the mandrel pin and the sleeve passage.

4 Claims, 2 Drawing Sheets

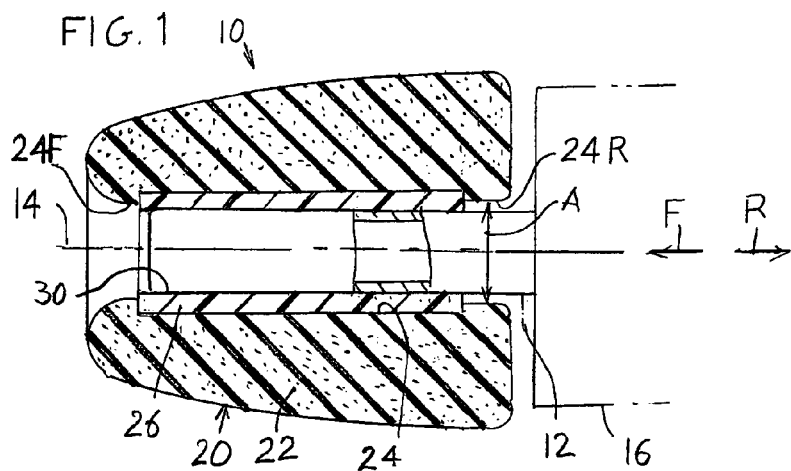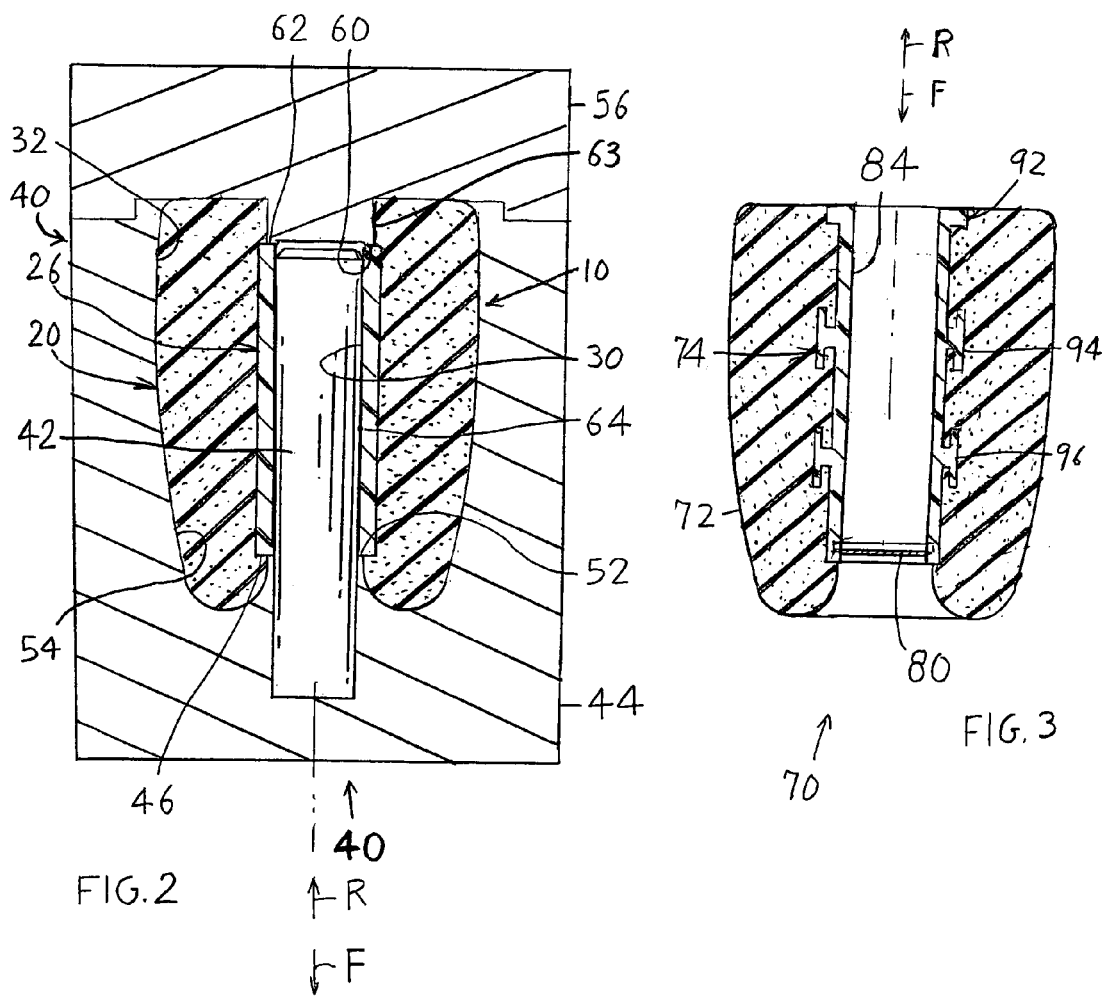

EARBUD AND METHOD OF MANUFACTURE

CROSS-REFERENCE

Applicant claims priority from U.S. Provisional Patent Application Ser. No. 60/899,895 filed Feb. 6, 2007.

BACKGROUND OF THE INVENTION

Earbuds that are inserted into the wearer's ear canal, are commonly used with audio headsets that include a sound tube out of which sound is emitted. The earbud carries sound from the sound tube directly to the ear canal of the wearer while blocking sound from the environment. The earbud commonly includes a soft foam body with a through body passage, and a sleeve of stiffer material (usually solid material rather than foam) lying within the body. A sound tube such as one of an MP3 or IPOD-compatible speaker device is inserted into the sleeve, with the sleeve anchoring the sound tube to the body. The earbud is inserted into a person's ear and is retained by the press-fit of the foam body with the walls of the person's ear canal.

One way to produce an earbud is to mold or extrude the foam body with a passage, and to separately produce the sleeve. The sleeve is inserted into the foam body passage, with adhesive used to bond the sleeve and body together. Such a process requires the application of adhesive to the sleeve and/or body. It is common for bonding quality issues (adhesive strength, coverage, and cosmetics) to complicate and add cost to the manufacturing process. It is important that the earbud be manufactured consistently as a high-quality product at low cost. It would be desirable to minimize handling of parts and avoid the need for adhesive application, and make earbud manufacture a one-step process.

SUMMARY OF THE INVENTION

In accordance with one embodiment of the invention, applicant provides an earbud for coupling to a sound tube and for fitting into a person's ear canal, and a method for producing the earbud, wherein the earbud is of reliable, attractive, and low cost construction. The soft foam body of the earbud is molded around the stiffer sleeve of the earbud, without any adhesive between them, but which relies on chemical bonding of the materials of the body and sleeve. The sleeve is shorter than the body, with both ends of the body extending beyond a corresponding end of the sleeve. Each sleeve end is partially embedded into the body, so about half of the sleeve wall thickness protrudes into the body passage.

The earbud is constructed by placing the sleeve in a cavity of a front mold part, with the sleeve placed around a mandrel pin that lies in the cavity. A quantity of foamable material in a fluid state is deposited into the cavity and the cavity is closed by placing a rear mold part over the front mold part. The front and rear mold parts have shoulders that substantially abut opposite ends of the sleeve, to prevent foaming material from leaking into the clearance space between the pin and the sleeve passage. When the foam solidifies, the mold is opened and the earbud is removed from the mandrel pin. The only handling of parts includes placing the sleeve on the mandrel pin, closing the mold and then opening it, and removing the earbud.

A variety of sleeve constructions can be used. A preferred construction is to extrude material to form a tube, and to cut the extrusion into individual sleeves. The sleeves are of constant cross-section along their lengths. Variations along the sleeve length are not required to hold the sleeve in the foam body because the sleeve is chemically bonded to the foam. It is also possible to construct the sleeve so it has a flange that is embedded into the body, or provide other sleeve radial projections to mechanically hold the sleeve in the body.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of an earbud of a first embodiment of the invention, which also shows a sound tube of a speaker coupled to the earbud.

FIG. 2 is a sectional view of the earbud of FIG. 1, shown in the process of constructing the earbud.

FIG. 3 is a sectional view of an earbud of a second embodiment of the invention, wherein the sleeve has radially outward projections for anchoring it to the body.

DETAILED DESCRIPTION OF THE INVENTION

Figure 4:
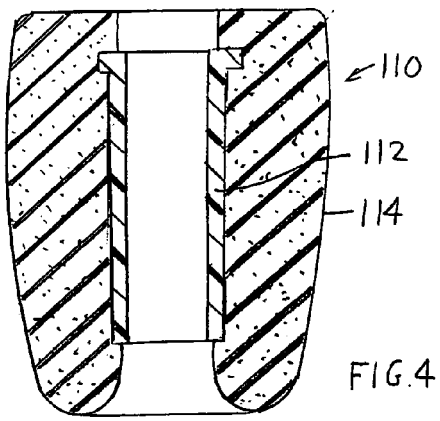
FIG. 4 is a sectional view of an earbud of a third embodiment of the invention, wherein the sleeve has a radially outward flange at its rear end.

FIG. 1 illustrates an earbud 10 of the present invention, and a prior art sound tube 12 that has been inserted forwardly F along the earbud axis 14 into the earbud. The sound tube extends from a sound source formed by a speaker 16 that generates sound. The earbud includes a body 20 of soft elastomeric foam material 22 with a through body passage 24 that extends between body opposite ends. The earbud also includes a sleeve 26 that is formed of more rigid, preferably elastomeric solid material. The sleeve has a sleeve passage 30. The sleeve prevents collapse of the foam body when it is inserted into the ear canal, and is more securely attached to the sound tube. The foam body is of soft elastomeric material, with a 25% IDF (indentation force deflection) value of between 5 and 30 newtons, and preferably between 10 and 20 newtons. Elastomeric material is material with a Young's modulus of elasticity of no more than 50,000 psi.

The more rigid material of the sleeve allows it to fit over but grip the sound tube 12, with secure retention. After the sound tube is installed, the earbud can be inserted forwardly F into a person's ear canal, and it will carry sound from the speaker 16 into the inner part of the person's ear canal while blocking, or sealing against, environmental noise. The particular sleeve 26 illustrated is of uniform inside and outside diameters, which allows it to be easily made by extruding a tube and cutting it into individual sleeves or otherwise separating out a section of the tube.

FIG. 2 illustrates a method that applicant uses to construct the earbud 10, in a process that involves handling a minimum number of small parts a minimum number of times. The sleeve is placed in the cavity 32 of a mold 40, with the sleeve passage 30 receiving a mandrel pin 42 that is fixed to a front mold member 44, which is the lower mold member. The sleeve is fully slid forward F into position, with the lower or front end of the sleeve abutting a rearward R, or upwardly-facing surface or ledge 52 of the mold. A quantity of foamable material is dispensed into a lower portion 54 of the cavity, around the sleeve. Then a rear, or upper mold member 56 is closed on the lower one and the foam material is allowed to solidify.

The mandrel pin 42 assures that the sleeve is accurately centered in the foam body. The pin helps assure that the upward-facing shoulder 52 of the mold engages the lower end 46 of the sleeve and that a lower surface 60 of the upper mold member or part will lie very close to the sleeve upper end 62. The upper mold member or part has a downward projection 63 that forms the forward or lower surface 60 that lies very close (within 0.1 millimeter) to the upper end 62 of the sleeve. Such closeness assures that the foamable material that will form the body of the earbud, will not leak into the gap 64 that lies between the mandrel core pin 42 and the sleeve passage 30. Such a slight gap 64 is preferred to make it easy to install the sleeve around the mandrel pin in the mold, even if the sleeve has been cut as with a grinding wheel but is not deburred. The molding process of FIG. 2 leaves front and rear body passage ends 24F, 24R (FIG. 1) with diameters A that are between the sleeve inside and outside diameters so each sleeve end is only partially embedded in the body. The body passage between the body ends, is not compressed or otherwise deflected when the earbud is not in a person's ear.

Thus, steps in the manufacture of the earbud include cutting a tubular extrusion into lengths suitable for the sleeve 26 (or molding the sleeve), installing a sleeve by sliding it over a mandrel pin of a mold, dispensing foamable material into the mold cavity, closing the mold and later opening it, and removing the completed earbud from the mold. The only small items that must be handled are the sleeves that must be slid over the mandrel pin, and the final earbud.

The body 20 and sleeve 26 are made of materials that securely bond to each other when the foam of the body solidifies while in contact with the sleeve. The fact that the body was molded around the sleeve can be readily determined by cutting open an earplug and examining it near the ends of the sleeve. Where a sleeve was installed after the body was molded, the body will show a deformation near each end of the sleeve that is not present in applicant's body.

Applicant has found that a preferred embodiment of the present earbud consists of a foam polyurethane (FPU) formed around or encompassing a thermoplastic elastomer urethane (TPU) sleeve. Chemical bonding between the two homologous (mutually chemically bonding) polymers occurs during the reaction of the FPU with the TPU of the sleeve. Bonding of these materials for the sleeve and body results in an earbud with greater integrity at the interface, which is the region that receive the greatest stress in normal use. It also minimizes the possibility of loss of physical properties that would result from the use of intermediate layer adhesives as in adhesive or cohesive failures, or from the misapplication of adhesive.

It has been shown that the ability to chemically bond or achieve mechanical locking of a TPU or a thermoplastic elastomer (TPE) is enhanced by raising the surface energy of the polymer by such means as, but not limited to, corona or plasma treatment, chemical priming or surface etching to increase the surface contact area. In addition to the treatment processes mentioned above it is possible to provide added surface area in the cavity wall structures of the molds themselves. Due to similarities in chemical compatibility and polarity and surface enhancement techniques, a variety of non-homologous thermoplastic elastomers (TPE's) also can be used as sleeve material and can be made capable of chemical bonding and/or mechanical locking as herein described.

FIG. 3 shows a body 72 that is molded around a sleeve 74 that has a sleeve passage 84 and that is physically locked to the sleeve. The earbud 70 of FIG. 3 has radially-outward projecting flanges 92, 94, and 96, and has undercuts along the perimeters of two of the flanges to securely encase the foam of the body in the sleeve. These projecting annular structures provide multiple physical anchors for the body, even where a strong chemical bond is not present, by preventing the sleeve from being pulled out of the body when the sound tube is installed or removed. In FIG. 3, the rear sleeve flange 92 is flush with the body rear end. A screen 80 that lies in a sleeve internal groove, blocks earwax.

Applicant has constructed earbuds of the type illustrated in FIGS. 1 and 2. The sleeve has a length of 0.300 inch (7.6 mm) and a sleeve passage inside diameter of 0.120 inch (30 mm). The sleeve stiffness should be between 30 and 90 Shore A. The body outside diameter can vary between 0.42 inch and 0.60 inch (11 mm and 15 mm) or a single size of 0.49 inch (12 mm) can be used. It is desirable to minimize sleeve wall thickness, especially near the sleeve front end, both for increased comfort and to optimize sound isolation. A tapered sleeve, with a thinnest wall near its front end, can do this, although such a sleeve usually cannot be obtained by simple extrusion.

Applicant has produced sleeves to be molded within bodies to form earbuds by the above method, in a variety of designs. These included sleeves that are tapered, have an external flange, internally barbed, made with internal passage pockets for the installation of sound filters, made with internal grooves for installation of anti-cerumen (earwax) shields, and made with a long bell-shaped profile or a low/short profile. The forward or rearward axial position of the sleeves can be varied from flush to the body rear end, rearwardly extended, or fully encased.

Figure 5:
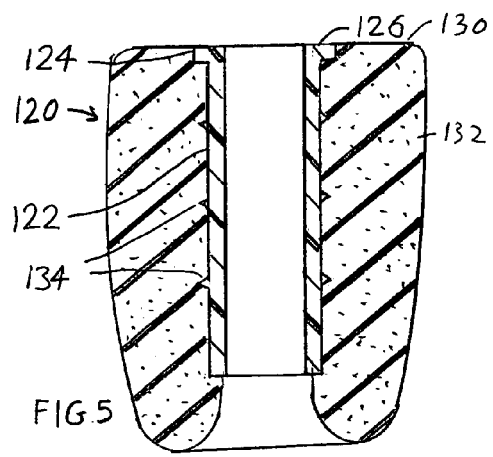
FIG. 5 is a sectional view of an earbud which is a variation of the third embodiment of the invention, with the flange at the rear end of the foam body.

FIGS. 4-10 show additional earbuds. In FIG. 4 the earbud 110 has a fully enclosed flanged sleeve 112 in a foam body 114. In FIG. 5 the earbud 120 includes a sleeve 122 with a flange 124 at its rear end, and with the flange rear end being flush with the rear end 130 of the foam body 132. In addition, the flange has barbs 134 to physically retain itself in a passage of the body.

Figure 6:
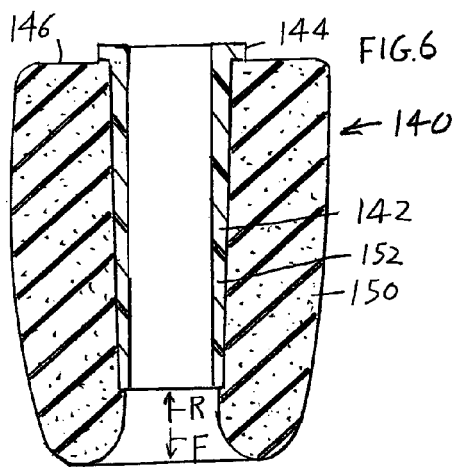
FIG. 6 is a sectional view of an earbud which is another variation of the third embodiment of the invention, with the sleeve being tapered.

FIG. 6 shows an earbud 140 wherein the sleeve insert 142 has a flange 144 lying rearward R of the rear end 146 of the foam body 150. The sleeve portion 152 of the insert is tapered to be of progressively smaller thickness at more forward F locations. This facilitates bending the sleeve portion to follow a bend in a person's ear canal.

Figure 7:
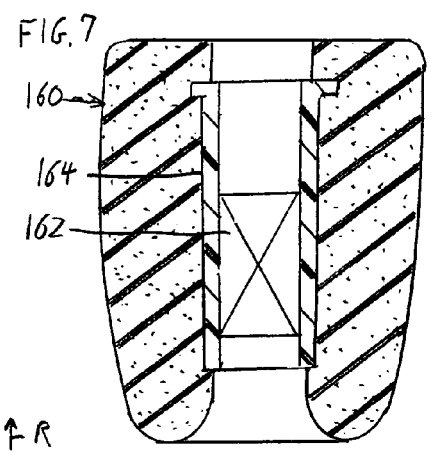
FIG. 7 is a sectional view similar to FIG. 4, with a sound filter in the sleeve.
Figure 8:
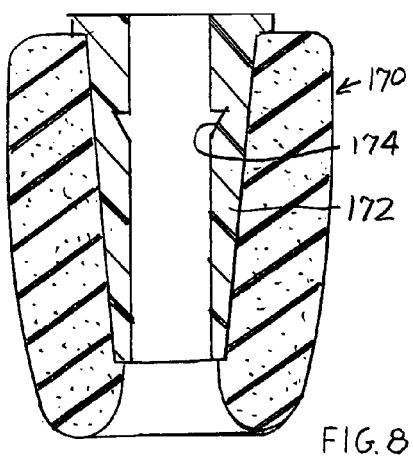
FIG. 8 is a sectional view of an earbud which is another variation of the third embodiment, with a groove for latching to a sound tube.
Figure 9:
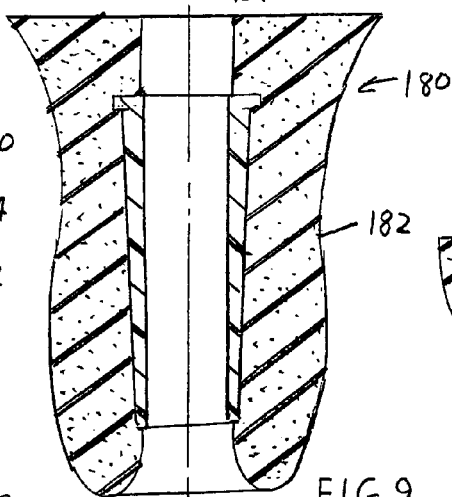
FIG. 9 is a sectional view of an earbud which is another variation of the third embodiment, with the earplug being elongated along its axis.
Figure 10:
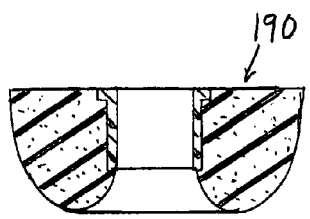
FIG. 10 is a sectional view of an earbud which is another variation of the third embodiment, with the earbud being shortened.

FIG. 7 shows an earbud 160 with a sound filter 162 press fit into a sleeve 164. FIG. 8 shows an earbud 170 with a sleeve 172 having an internal groove 174 that can be latched to by a sound tube that has a male barb. FIG. 9 shows a long profile earbud 180, in which the body 182 has a rearward R and radially outward (with respect to axis 184) flair. FIG. 10 shows a short earbud 190.

Thus, the invention provides an earbud that can be connected to a sound tube by inserting the sound tube into a sleeve of the earbud, and that can be inserted into the ear canal of a person to carry sound from the sound tube to the person's ear canal while blocking environmental noise. The earbud includes a body of soft foam, and a sleeve of stiffer material. The body and sleeve are preferably formed of homologous materials so they chemically bond when the body is molded around the sleeve. The foam body is preferably molded around the sleeve within a mold cavity. The mold has an upwardly-facing shoulder that contacts the lower surface of the sleeve. The mold also has a downward facing shoulder, such as one on a downward projection that projects downward within the cavity to form the top of the body passageway that lies above the top of the sleeve. The downward facing shoulder lies very close (within 0.1 mm) to the upper end of the sleeve, to minimize or prevent the leakage of foam material into the gap between the body and sleeve. The sleeve can be a simple length of extruded tube that has been cut off. Other sleeve constructions can be used including sleeves with flanges and sleeves with radially outward projections for locking to the body.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for constructing an earbud with a soft body of elastomeric body material that has an axis and a through body passage extending along said axis, including forming a sleeve of stiffer material than said body material to lie within said body passage with said sleeve having a sleeve passage, comprising:

placing the sleeve in a cavity of a mold front part, and placing the sleeve over a mandrel pin that lies in said cavity, placing a quantity of said elastomeric body material which is in a flowable state in said cavity, and closing the mold by placing a rear mold part over the front mold part;

allowing said elastomeric body to solidify, and then opening the mold and removing the body and sleeve as a unit.

2. The method described in claim 1 wherein:

said step of placing the sleeve in the mold includes laying a front end of said sleeve against a rearward facing ledge of said mold;

said step of closing the mold includes placing a rear mold cover over said front mold part including placing a forward surface of said rear mold cover no further than 0.1 millimeter from a rear end of the sleeve, to resist the leakage of body material into a space between said mandrel pin and a passage of said sleeve.

3. The method described in claim 1 wherein:

said set of forming said sleeve includes extruding a long sleeve extrusion and separating out a section of said long sleeve extrusion to obtain said sleeve.

4. The method described in claim 1 wherein:

said sleeve has a smaller length than said body and said sleeve has inside and outside surfaces;

said mold cavity defines the shape of said body passage beyond an end of said sleeve including front and rear body passage ends that lie respectively forward and rearward of said sleeve, with a mold portion that forms an inside of said front body end having a cavity diameter that is between said sleeve inside and outside diameters thereat, and with a mold portion that forms said rear body end having a cavity diameter between said sleeve inside and outside diameters, thereat.

* * * * *